May 31, 1927.                S. K. WELLMAN                1,631,077
                              SHOCK ABSORBER
                          Filed Aug. 8, 1922        4 Sheets-Sheet 2
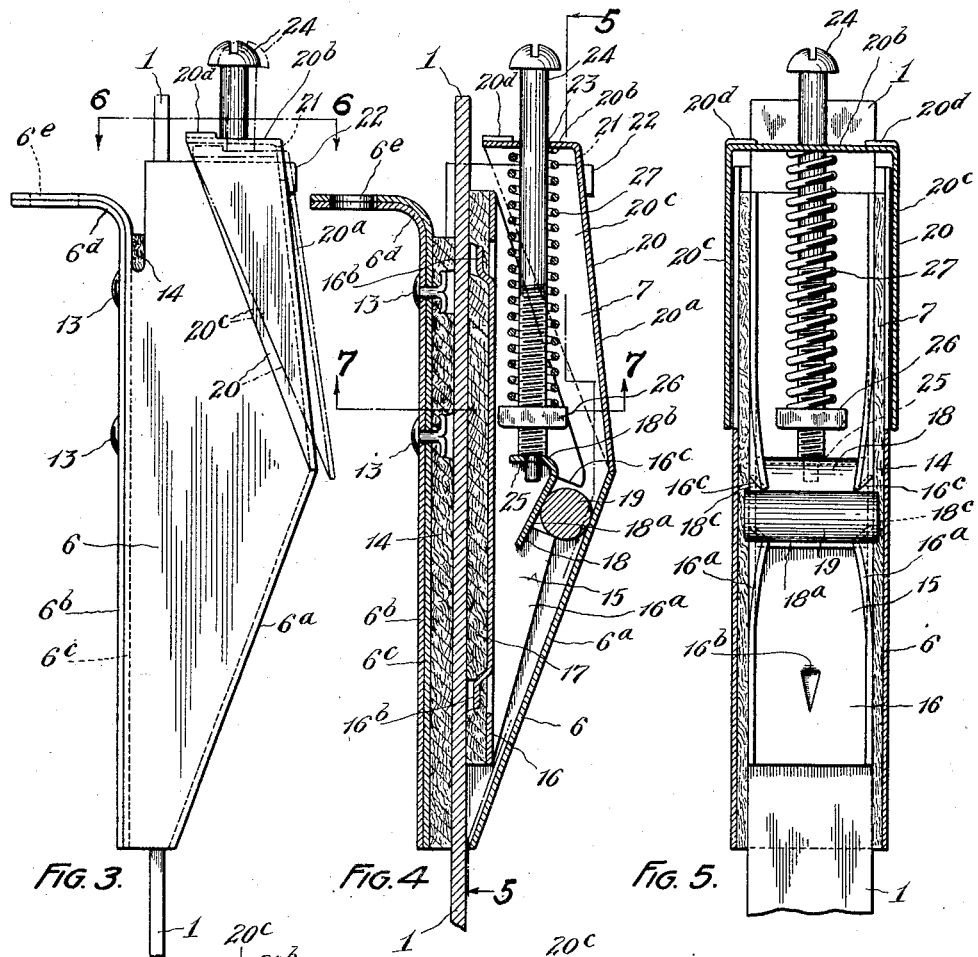
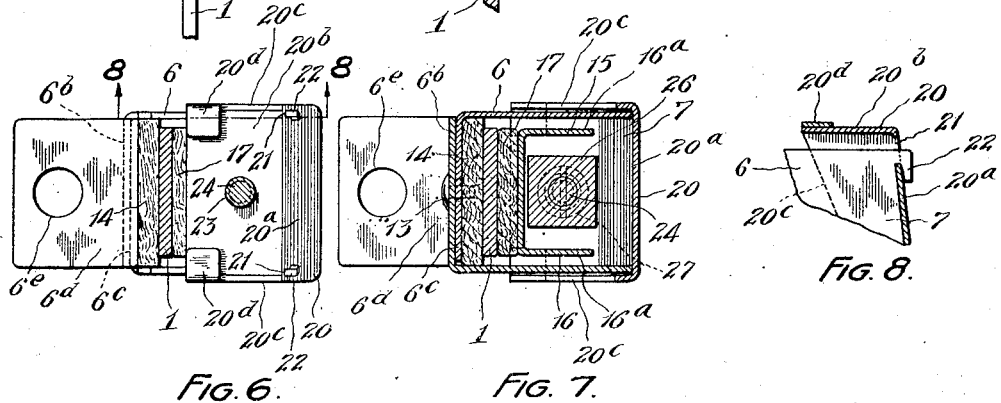
INVENTOR
Samuel K. Wellman
BY
ATTORNEY.

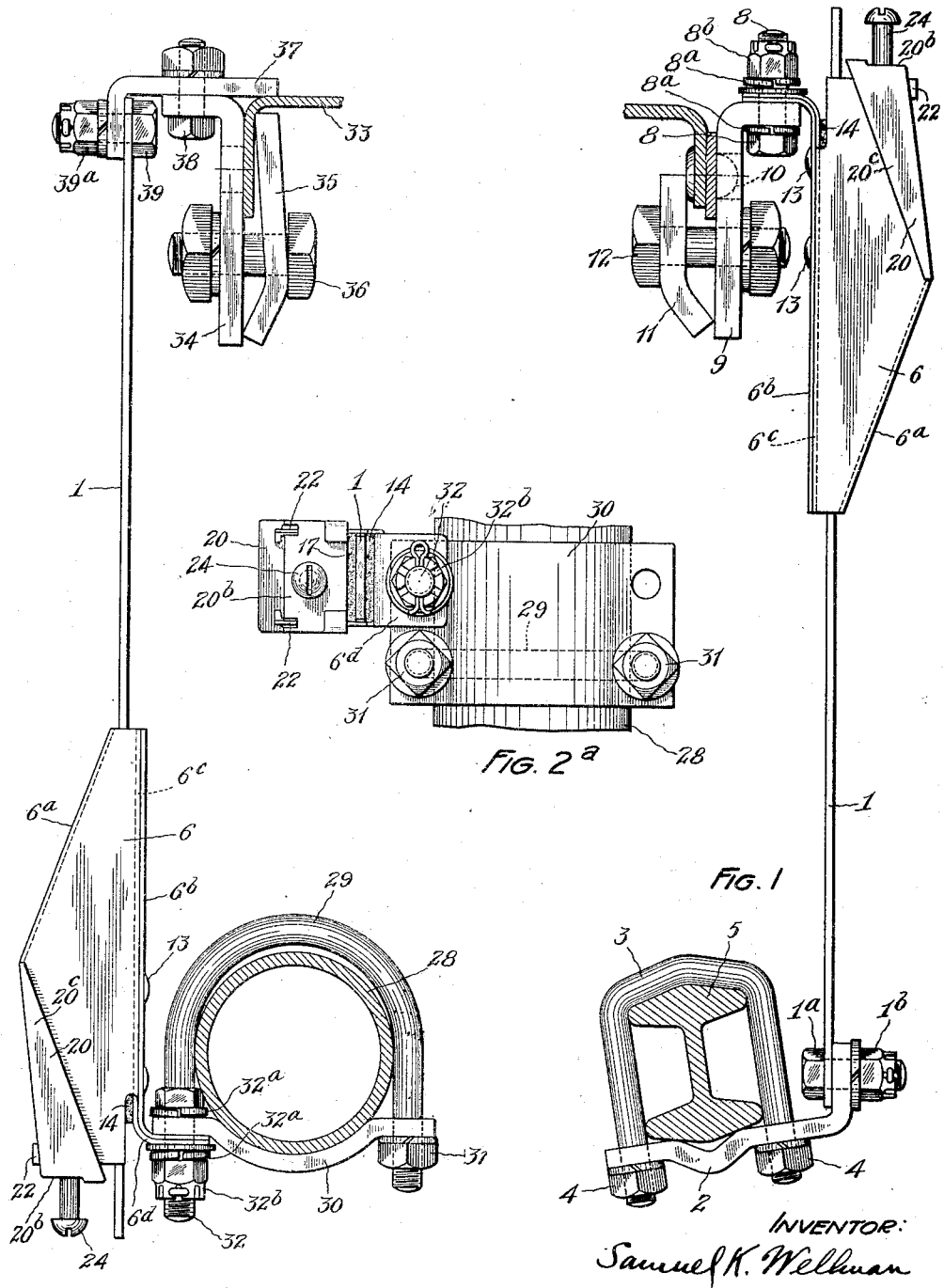

May 31, 1927.

S. K. WELLMAN 1,631,077

SHOCK ABSORBER

Filed Aug. 8, 1922

INVENTOR:
Samuel K. Wellman
BY
Roy A. Fehr
ATTORNEY.

Patented May 31, 1927.

1,631,077

UNITED STATES PATENT OFFICE.

SAMUEL K. WELLMAN, OF CLEVELAND, OHIO.

SHOCK ABSORBER.

Application filed August 8, 1922. Serial No. 580,483.

The invention relates to shock absorbers for motor vehicles and especially to shock absorbers of the type shown in the U. S. Letters Patent to Andrew Christianson, No. 1,156,665, in which slight resistance is offered to the compression of the vehicle springs but a substantial resistance is opposed to their subsequent expansion so that the vehicle body rises gradually and is protected from the sudden rebound and shock that would otherwise occur.

The chief objects of my invention are comprehended in the provision of a shock absorber of the character in question that is effective and dependable in operation under all service conditions, neat in appearance, light in weight and capable of being manufactured at a low cost.

Another object of the invention, ancillary to the foregoing, is the provision of an improved friction material affording a friction surface with a coefficient of friction substantially constant notwithstanding variations of the atmospheric temperature and access of water to the material.

Another ancillary object of the invention is the provision of a shock absorber the parts of which are reduced to a minimum number and are for the most part adapted to be stamped or pressed from sheet or bar metal without the need of any additional machine work.

Another object of the invention is the provision of a shock absorber with fastening means adapted to secure it to the axle and frame of a vehicle without any structural alteration of said axle and frame.

Other objects, more or less ancillary or incidental to those first stated, as well as the manner of attaining all of the various objects, will appear in the following description setting forth in connection with the accompanying drawings a preferred embodiment of the invention as applied to a Ford car.

In the drawings:

Fig. 1 is a side elevation of one of my improved shock absorbers mounted on the front axle and body frame of the vehicle.

Fig. 2 is a side elevation of the shock absorber mounted on the rear axle and body frame of the vehicle.

Fig. 2ª is a bottom plan view of the rear axle and the shock absorber parts attached thereto as shown in Fig. 2.

Fig. 3 is a side elevation on a larger, full-sized scale of the main parts of the shock absorber.

Fig. 4 is a vertical longitudinal section through the main parts of the shock absorber shown in Fig. 3.

Fig. 5 is a section on the broken line 5—5, Fig. 4.

Fig. 6 is a section on the line 6—6, Fig. 3.

Fig. 7 is a section on the line 7—7, Fig. 4.

Fig. 8 is a fragmentary section on the line 8—8, Fig. 6.

Figure 9:
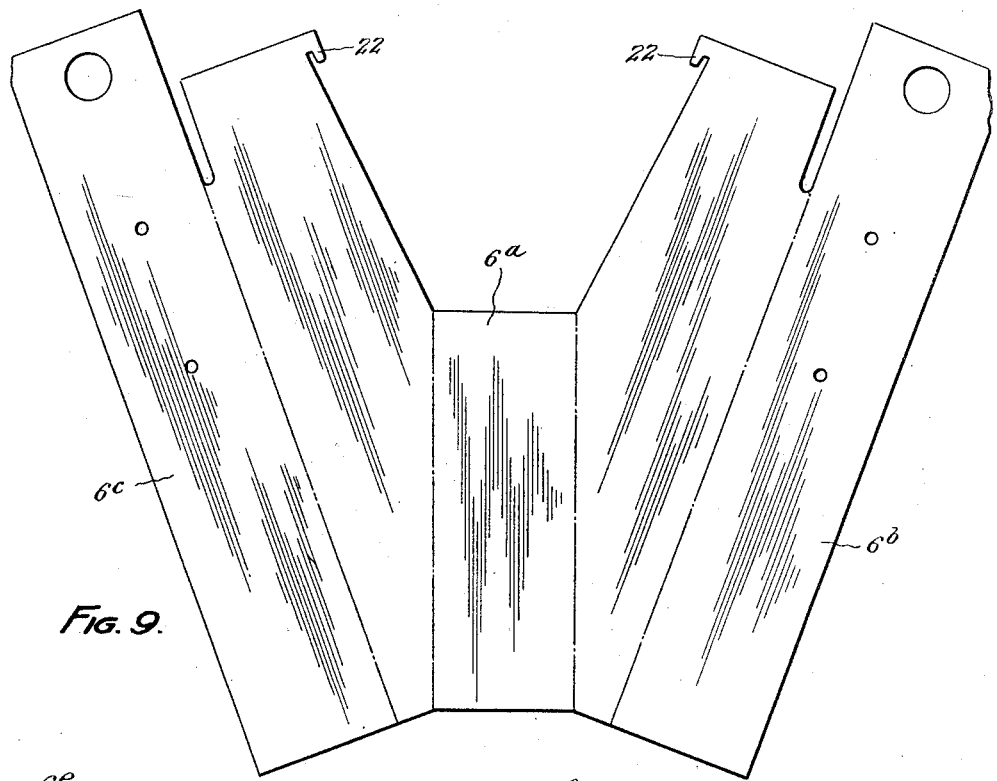

Fig. 9 is a development of the sheet metal casing of the shock absorber showing its form as punched from a sheet of metal.

Figure 10:
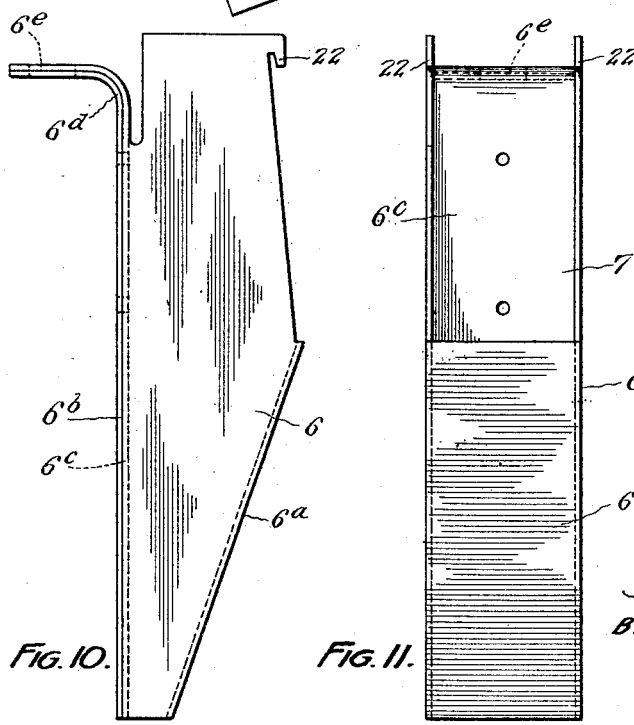
Figure 11:
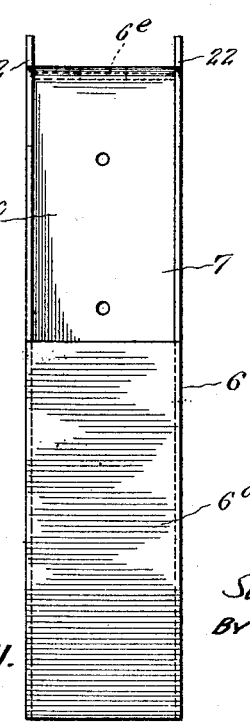

Figs. 10 and 11 are side and front elevations, respectively, of said casing after it has been bent to finished form.

Figure 12:
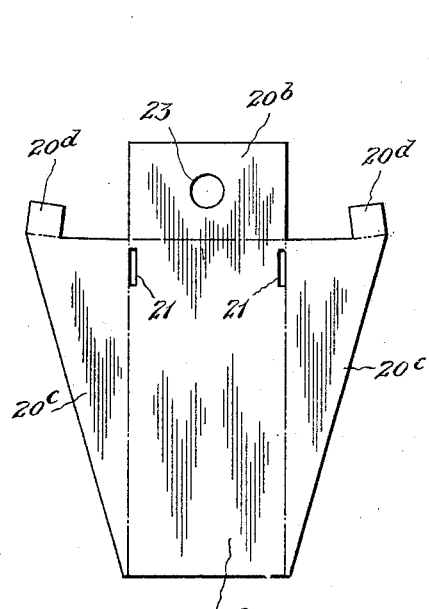

Fig. 12 is a development of the casing cover showing its form as punched from a sheet of metal.

Figures 13, 14:
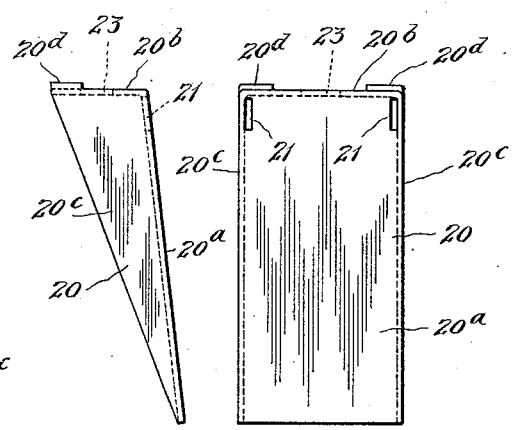

Figs. 13 and 14 are side and front elevations, respectively, of the cover after it is bent to finished form.

Figure 15:
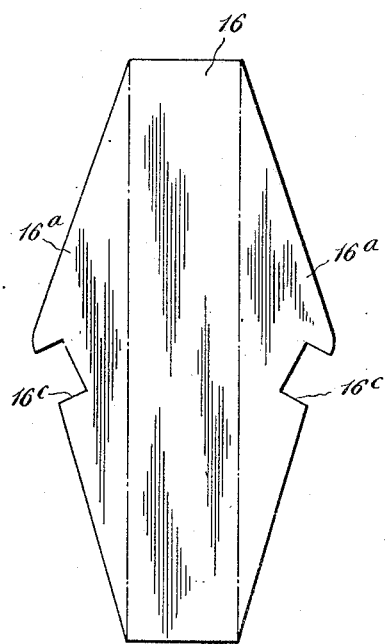

Fig. 15 is a development of the main part of the movable friction member of the shock absorber showing its form as punched from a sheet of metal.

Figures 16, 17:
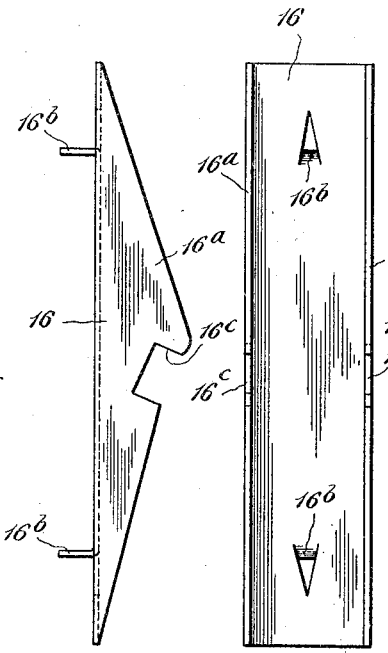

Figs. 16 and 17 are side and front elevations, respectively, of said main part of the movable friction member after it is bent to finished form.

Figure 18:
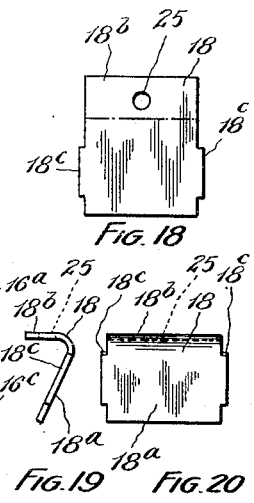

Fig. 18 is a development of another part of the movable friction member showing its form as punched from a sheet of metal.

Figures 19, 20:
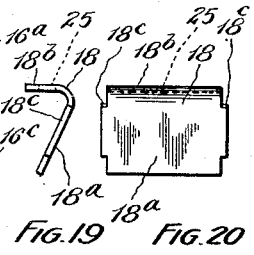

Figs. 19 and 20 are side and front elevations, respectively, of said last-mentioned part after it is bent to finished form.

Referring in detail to the construction illustrated, 1 is an elongated flexible friction plate having one end perforated and secured by a bolt 1ª to the perforated upstanding end of the yoke 2 of U-bolt 3, said U-bolt and yoke being rigidly clamped by nuts 4 to the front axle 5 of the vehicle, as shown in Fig. 1. The bolt 1ª is preferably provided with a positively locked nut 1ᵇ and a spring washer, as shown.

The friction plate 1 extends slidably through an elongated casing 6 which, in the preferred construction shown, is made of sheet metal, the body of the casing being punched in a single piece from the sheet in the form shown in Fig. 9 and then bent into the finished form shown in Figs. 10 and 11. This casing in finished form is larger at one end than the other, has both of its ends open and has an opening 7 in its front wall extending from points intermediate its ends to its open, larger end. From the opening 7 to the smaller end of the casing is a wall 6ª which is inclined longitudinally toward the opposite wall of the casing which latter wall is formed by two overlapping sides 6ᵇ, 6ᶜ of the sheet metal blank. The sides 6ᵇ, 6ᶜ are extended at one end to form a double flexible connecting strap 6ᵈ, which is perforated at 6ᵉ to engage a fastening bolt. As shown in Fig. 1 the strap 6ᵈ is secured by a bolt 8 to a clamp which consists of an angle plate 9 perforated or recessed to engage a structural rivet 10 of the vehicle frame, a second angle plate 11 and a bolt 12. The bolt 8 is fitted with spring washers 8ª, 8ª above and below the plate 9 and with a positively locked nut 8ᵇ which is adjusted to only partially flatten the washers 8ª, thus providing lateral flexibility in the coupling between the casing 6 and the plate 9. The rivet 10 is a part of the standard structure of a Ford car and is disposed near the end of the transverse channel bar of the chassis frame directly above the front axle.

The casing 6 when bent into its finished form requires little to secure it in that form but I nevertheless provide for this purpose two rivets 13, 13 which extend through the overlapping sides 6ᵇ, 6ᶜ of the casing and serve also to secure in the casing a friction facing 14, the rivets having their inner ends split so that they are adapted to be bent over and clinched into the facing 14 with a substantial counter-sink as indicated in Fig. 4. The friction facing 14, which is arranged to engage one face of the friction plate 1 is made of an absorbent material impregnated with a substance having a coefficient of friction that is substantially uniform under all service conditions.

I prefer to form this face 14 of suitable fibrous material, such as woven cotton webbing, thoroughly impregnated with a substance having the frictional characteristics mentioned. The invention is not limited to the use of any particular substance for this purpose but of the materials which I have employed I have found a saponified mixture of grease, particularly animal fat, and wax most satisfactory. In practice the preferred composition consists of 75% commercial "tallow compound" and 25% beeswax (percentages by weight). "Tallow compound No. 2" of the United Lubricant Company of Cleveland, Ohio, has been found satisfactory, it being typical of the commercial tallow compounds, which are saponified mixtures of tallow and mineral oil. The mixture is heated in a suitable receptacle until it is sufficiently liquid to thoroughly penetrate the cotton webbing immersed therein without charging it. A temperature of 260° F. is suitable and with the mixture maintained at this temperature I keep the webbing immersed therein for six or seven hours to insure thorough penetration. The webbing thus treated, after withdrawal from the bath and cooling to normal temperature, is found to be impregnated with a plastic substance which furnishes the desired friction surface for engagement with the friction plate 1.

In the casing 6 is mounted a movable friction member 15, the main part of which is in the form of a sheet metal stamping 16, the blank form of which is shown in Fig. 15. This blank has its sides bent up to form flanges 16ª, 16ª and is provided with integral struck-up prongs 16ᵇ, 16ᵇ which serve to secure to the one side of the member a friction facing 17 which is of the same character as the facing 14, the said facings 14 and 17 engaging the opposite sides of the friction plate 1. The flanges 16ª are notched at 16ᶜ to receive a bearing plate 18, the blank sheet metal form of which is shown in Fig. 18. This bearing plate when bent into finished form has an inclined bearing surface 18ª, a spring abutment 18ᵇ, and short extensions or lugs 18ᶜ, 18ᶜ which fit into the notches 16ᶜ of the main part of the movable friction member 15. The plate 18 is secured to the member 15 by simply bending over the flanges 16ª, 16ª adjacent the notches as shown in Fig. 5.

An anti-friction roller 19 is mounted in the notches 16ᶜ of the friction member 15, being interposed between the latter's bearing plate 18 and the inclined wall 6ª of the casing. For a reason which will be explained later the bearing plate 18 and the wall 6ª are disposed at a slight angle to each other.

A cover or cap 20 is provided for the casing and comprises a section 20ª to close the side opening 7 of the casing and a section 20ᵇ to partially close the adjacent open end of said casing. The cap 20 is preferably formed of a single part stamped from sheet metal, its blank form being shown in Fig. 12 and its finished form in Figs. 13 and 14. In addition to the side and end sections 20 and 20ᵇ the cap is formed with wing sections 20ᶜ, 20ᶜ which have lug-like extensions 20ᵈ, 20ᵈ and, when the different sections are bent to form, the lugs 20ᵈ overlie the sections 20ᵇ so as to strengthen the structure. The section 20ª is formed with a pair of slots 21 which fit over notched lugs 22 formed on the casing structure 6. The end section 20ᵇ of the cap is formed with an aperture 23 in which is slidably mounted a rod or bolt 24 which has its inner end turned down to provide a swivel engagement with an aperture 25 in the bearing plate 18. A nut 26 is mounted on the inner threaded end of the bolt 24 and serves as an adjustable abutment thereon for one end of a spiral spring 27 which is mounted on the bolt 24 between said abutment and the inner side of the end section 20ᵇ of the cap 20. The nut 26 is preferably square and is disposed near enough the adjacent face of the movable friction member 15 so that the latter prevents its rotation on the bolt 24. By simply turning the bolt 24 the nut 26 can be adjusted on the bolt to vary the tension of the spring 27, said spring serving to press the friction member 15 toward the inclined wall 6ᵃ of the casing and, by reason of the reaction of the latter through the roller 19, to press the friction member 15 against the friction plate 1 and said plate in turn against the friction facing 14. The spring 27, in addition to exerting the pressure referred to on the friction member 15, serves by its reaction to hold the cap 20 in position on the casing, though I prefer to supplement the action of the spring by slightly bending over the ends of the lugs 22, as indicated in Fig. 6.

In assembling the movable parts in the casing 6, the friction plate 1 is inserted in the casing in contact with the friction facing 14, and then, with the casing preferably disposed in a horizontal position, the movable friction member 15 is inserted through the side opening 7 and the adjacent open end of the casing with the roller 19 supported on the bearing plate 18. The friction member 15 is then moved endwise to bring the roller into engagement with the inclined wall 6ᵃ of the casing. The cover 20 with the bolt 24, nut 26 and spring 27 assembled thereon are then applied to the casing by introducing the end of the bolt 24 into the aperture 25 of the bearing plate 18 and then, by pressing the cover down against the tension of the spring 27, as shown by the dotted lines in Fig. 3, the slots 21 of the cover are forced over the lugs 22 of the casing, whereupon the spring 27 forces the cover 20 endwise into the notches of the lugs 22 so as to hold the cover in its normal closed position. To prevent accidental disengagement of the cover I prefer, after assembly as described, to bend over the ends of the lugs 22 somewhat so that the latter will not pass through the slots 21 of the cover. Of course, if disassembly of the parts becomes necessary the lugs 22 can readily be straightened to permit removal of the cover.

When the shock absorber is applied to the rear axle and frame parts of a Ford car, it is inverted and the casing 6 is connected to the axle and the friction plate 1 is connected to the vehicle frame. To secure the casing 6 to the round tubular axle casing 28 I provide a U-bolt 29 which is formed on a radius somewhat smaller than that of the axle casing 28, a wide yoke 30 and nuts 31. When said nuts are tightened the U-bolt 29 is drawn upon the axle casing 28 with a tight wedging action which is very effective and serves to rigidly secure said bolt against turning on the casing. The flexible strap 6ᵈ of the casing 6 is secured to the yoke 30 by a bolt 32 which is fitted with spring washers 32ᵃ, 32ᵃ above and below the yoke and with a positively locked nut 32ᵇ, the yoke being perforated to receive the bolt 32 and preferably the yoke is provided with two perforations so that it can be used on either the right or left side of the car. As in the case of the nut 8ᵇ, nut 32ᵇ is adjusted to only partially flatten washers 32ᵃ and thus provide lateral flexibility in the coupling.

To secure the end of the friction plate 1 to the plain transverse channel bar 33 of the vehicle frame, I provide a clamp comprising an angle plate 34 (similar to plate 9), a second angle plate 35, bolt 36 and an angle plate 37 and bolt 38. The angle plates 34 and 35 strongly grip the flange of the inverted channel bar 33 while the plate 37 engaging the top of said bar, prevents displacement of the angle bars 34 and 35. The perforated end of the friction plate 1 is secured to the down-turned end of plate 37 by a bolt 39 which is fitted with a spring washer and a positively locked nut 39ᵃ.

It will be observed that both at the front and rear ends of the car the shock absorber is secured to the channel bars of the vehicle frame by clamping devices which are readily secured without any structural alteration whatever of the vehicle frame.

The shock absorber is applied in inverted relation to the rear end of the car simply to avoid interference between the free end of the friction plate 1 and the body of the car when the vehicle springs are compressed.

In the operation of my improved shock absorber, the spring 27 exerts a continuous pressure on the movable friction member 15 tending to frictionally grip the plate 1 between the friction faces 14 and 17. When the vehicle springs are compressed the friction between the plate 1 and the facing 17 opposes the tension of the spring 27 so that the frictional resistance to the movement of the plate 1 between the friction facings is relatively small; but when the vehicle springs thereupon start to expand, and the relative movement of the friction plate and the casing 6 is reversed, the friction between the said plate and the facing 17 is added to the pressure of the spring 27 so that the movable friction member 15 is forced relatively strongly against the roller 19 and the inclined wall 6ᵃ of the casing and the friction plate 1 is gripped between the friction facings 14 and 17 with a correspondingly heavy pressure and a resulting high frictional resistance to the relative movement of the friction plate and the casing. The expansion of the vehicle springs is thus made relatively slow and the sudden rebound which would otherwise result is obviated.

During the expansion of the vehicle springs the friction between the plate 1 and the friction facing 17, added to the tension of the spring 27, causes a slight endwise movement of the friction member 15 with a resultant rolling of the roller 19 on the casing wall 6ª and the bearing plate 18, such rolling movement being provided for by making the notches 16ᶜ somewhat wider than the diameter of the roller 19. As previously noted, the bearing plate 18 is disposed at a somewhat larger angle to the friction plate 1 than is the casing wall 6ª and this insures the normal positioning of the roller 19 as indicated in Fig. 4, so that the roller action will not be interfered with.

By adjusting the tension of the spring 27 the shock absorber may be caused to afford any desired frictional resistance to the action of the springs, said frictional resistance being determined by the coefficient of friction of the materials, the angle between the plate 1 and the wall 6ª of the casing and the spring pressure.

As the vehicle axles and frame move toward and from each other with the compression and expansion of the vehicle springs, said axles and frame, by reason of radius rod connections, change their angular relation to each other and consequently there must be a fore and aft flexibility either of the shock absorber structure or of the devices by which it is connected to the axles and vehicle frame. In my improved construction the friction plate 1 and the flexible strap 6ᵈ of the shock absorber casing provide this necessary flexibility and make it possible to rigidly connect the shock absorber parts to the axles and vehicle frame by simple and effective devices.

In addition to the fore and aft flexibility thus secured, ample provision is made for lateral flexibility to accommodate side sway of the vehicle frame relative to the axles. This lateral flexibility is provided in part by the partially compressed washers 8ª and 32ª, respectively, and in part by the pivotal connections afforded by the bolts 1ª and 39, respectively. In addition, it will be noted that the friction plate 1 is made materially narrower than the casing.

I have found that my improved shock absorber is highly effective and reliable under all service conditions. The friction facings 14 and 17 are highly uniform in their action regardless of temperature changes from the cold of winter to the heat of summer and, more important still, regardless of access of water to these surfaces. As previously indicated, this uniform action is due to the fact that the friction facings employed maintain a substantially uniform coefficient of friction under these varying conditions of service. This feature is of especial importance in devices of the character in question which apply the frictional pressure to the parts by means of a wedging action.

From an inspection of the construction illustrated and described it will be seen that the apparatus consists of a relatively small number of parts the chief of which are made from simple sheet metal stampings, that these parts require little machine work and are readily assembled. In addition, the apparatus is relatively light in weight, compact, and neat in appearance. The friction facing 14, which in the operation of the device is characterized by a substantially constant coefficient of friction, is not claimed alone herein as it constitutes the subject matter of my copending application Serial No. 710,700, filed May 2, 1924.

It will be understood that various modifications of the preferred form of construction which has been illustrated and described can be made without departing from the invention, the scope of which is indicated by the appended claims.

What I claim is:

1. In a shock absorber for vehicles with spring-suspended bodies, the combination of relatively movable mutually engaging friction parts adapted to be connected respectively to the vehicle body and axle, one of said parts having a facing adapted to maintain its coefficient of friction substantially constant under varying moisture conditions.

2. In a shock absorber for vehicles with spring-suspended bodies, the combination of relatively movable mutually engaging friction parts adapted to be connected respectively to the vehicle body and axle, one of said parts having a facing adapted to maintain its coefficient of friction substantially constant under varying moisture and temperature conditions.

3. In a shock absorber adapted to be interposed between an axle and the spring-suspended body of a vehicle, the combination of a friction plate adapted to be connected to one of said vehicle parts, a casing adapted to be connected to the other vehicle part, a friction facing fixed in said casing so as to engage one side of said plate, a member movably mounted in the casing and having a friction facing arranged to engage the other side of said friction plate, the said facings having a coefficient of friction substantially constant under varying moisture conditions, and means for pressing the movable friction member against the friction plate.

4. In a shock absorber adapted to be interposed between an axle and the spring-suspended body of a vehicle, the combination of a friction plate adapted to be connected to one of said vehicle parts, a casing adapted to be connected to the other vehicle part, a friction facing fixed in said casing so as to engage one side of said plate, a member movably mounted in the casing and having a friction facing arranged to engage the other side of said friction plate, the said facings having a coefficient of friction substantially constant under varying moisture conditions, an antifriction roller interposed between the movable member and a wall of the casing inclined toward the friction plate, and resilient means for pressing the movable member toward the inclined wall and thereby forcing it against the friction plate.

5. In a shock absorber adapted to be interposed between an axle and the spring-suspended body of a vehicle, the combination of a friction plate adapted to be connected to one of said vehicle parts, a casing adapted to be connected to the other vehicle part, a friction facing fixed in said casing so as to engage one side of said plate, a member movably mounted in the casing and having a friction facing arranged to engage the other side of said friction plate, the said movably mounted member being made of sheet metal formed with integral prongs and its facing having a fibrous body penetrated and secured by said prongs.

6. In a shock absorber adapted to be interposed between an axle and the spring-suspended body of a vehicle, the combination of a friction plate adapted to be connected at one end to one of said vehicle parts, a casing structure formed from a sheet of metal having its meeting sides overlapped to form one side of the casing and an extension thereof of double thickness, means for securing the end of said extension to the other vehicle part, and friction faces in said casing between which the friction plate is slidably mounted.

7. In a shock absorber adapted to be interposed between the axle and the spring-suspended body of a vehicle, the combination of a friction plate adapted to be connected at one end to one of said vehicle parts, a casing structure formed from a sheet of metal having its meeting sides overlapped to form one side of the casing and an extension thereof of double thickness, means for securing the end of said extension to the other vehicle part, a friction facing in the casing to engage one side of said friction plate, and securing means for said friction facing extending through the latter and the said overlapped parts of the casing.

8. In a shock absorber adapted to be interposed between an axle and the spring-suspended body of a vehicle, the combination of a flexible friction plate adapted to be rigidly connected at one end to one of said vehicle parts, a casing structure formed from a sheet of metal having its meeting sides overlapped to form one side of the casing and a flexible extension thereof of double thickness, means for rigidly securing the end of said extension to the other vehicle part, and friction faces in said casing between which the friction plate is slidably mounted.

9. In a shock absorber adapted to be interposed between an axle and the spring-suspended body of a vehicle, the combination of a friction plate adapted to be connected at one end to one of said vehicle parts, a casing structure formed from a sheet of metal having its meeting sides overlapped to form one side of the casing and a flexible extension thereof of double thickness, means for rigidly securing the end of said extension to the other vehicle part, and friction faces in said casing between which the friction plate is slidably mounted.

10. In a shock absorber adapted to be interposed between an axle and the spring-suspended body of a vehicle, the combination of a friction plate adapted to be connected at one end to one of said vehicle parts, an elongated casing adapted to be connected to the other vehicle part, said casing having a side wall section inclined longitudinally toward the opposite side wall, a friction facing secured in the casing opposite said inclined wall section to engage one side of said friction plate, a movable member in the casing with a friction facing engaging the other side of said plate, the casing having an opening for the insertion of the movable friction member, an anti-friction roller between the movable member and said inclined wall section, a cover for said opening removably secured to the casing, a rod interposed between said two movable member and cover parts and having at one end a swivelling sliding engagement with one of said two parts and at its other end a swivelling thrust engagement with the other of said two parts, said rod having an abutment thereon near its latter end, and a spiral spring on the rod with one end engaging said abutment and the other end engaging the part with which the rod has said swivelling sliding engagement.

11. In a shock absorber adapted to be interposed between an axle and the spring-suspended body of a vehicle, the combination of a friction plate adapted to be connected at one end to one of said vehicle parts, an elongated casing adapted to be connected to the other vehicle part, said casing having a side wall section inclined longitudinally toward the opposite side wall, a friction facing secured in the casing opposite said inclined wall section to engage one side of said friction plate, a movable member in the casing with a friction facing engaging the other side of said plate, the casing having an opening for the insertion of the movable friction member, an anti-friction roller between the movable member and said inclined wall section, a cover for said opening removably secured to the casing, a rod interposed between said two movable member and cover parts and having at one end a swivelling sliding engagement with one of said two parts and at its other end a swivelling thrust engagement with the other of said two parts, said rod having an abutment adjustably mounted thereon near its latter end, and a spiral spring on the rod with one end engaging said abutment and the other end engaging the part with which the rod has said swivelling sliding engagement.

12. In a shock absorber adapted to be interposed between an axle and the spring-suspended body of a vehicle, the combination of a friction plate adapted to be connected at one end to one of said vehicle parts, an elongated casing adapted to be connected to the other vehicle part, said casing having a side wall section inclined longitudinally toward the opposite side wall, a friction casing secured in the casing opposite said inclined wall section to engage one side of said friction plate, a movable member in the casing with a friction facing engaging the other side of said plate, the casing having an opening for the insertion of the movable friction member, an anti-friction roller between the movable member and said inclined wall section, a cover for said opening removably secured to the casing, a threaded rod interposed between said two movable member and cover parts and having a swivelling sliding engagement with one of said two parts and a swivelling thrust engagement with the other of said two parts, a nut on the threaded rod held against turning in the casing, and a spiral spring on the rod interposed between said nut and one of said two parts.

13. In a shock absorber adapted to be interposed between an axle and the spring-suspended body of a vehicle, the combination of a friction plate adapted to be connected at one end to one of said vehicle parts, an elongated casing adapted to be connected to the other vehicle part, said casing having a side wall section inclined longitudinally toward the opposite side wall, a friction facing secured in the casing opposite said inclined wall section to engage one side of said friction plate, a movable member in the casing with a friction facing engaging the other side of said plate, the casing having an opening for the insertion of the movable friction member, an anti-friction roller between the movable member and said inclined wall section, a cover for said opening removably secured to the casing, a rod having an abutment thereon and slidably secured in a perforation through said cover, and a spiral spring on the rod with one end engaging the inner side of the cover and the other end engaging said abutment, the inner end of said rod having a freely detachable engagement with the movable friction member, whereby the cover, rod and spring can be applied to and detached from the casing as a unit.

14. In a shock absorber adapted to be interposed between an axle and the spring-suspended body of a vehicle, the combination of a friction plate adapted to be connected at one end to one of said vehicle parts, an elongated casing adapted to be connected to the other vehicle part, said casing having a side wall section inclined longitudinally toward the opposite side wall, a friction facing secured in the casing opposite said inclined wall section to engage one side of said friction plate, a movable member in the casing with a friction facing engaging the other side of said plate, the casing having an opening for the insertion of the movable friction member, an anti-friction roller between the movable member and said inclined wall section, a cover for said opening removably secured to the casing, a rod slidably secured in a perforation through said cover, an adjustable abutment on the inner part of the rod, and a spiral spring between said abutment and the inner side of the cover, the inner end of said rod having a freely detachable engagement with the movable friction member, whereby the cover, rod and spring can be applied to and detached from the casing as a unit.

15. In a shock absorber adapted to be interposed between an axle and the spring-suspended body of a vehicle, the combination of a friction plate adapted to be connected at one end to one of said vehicle parts, an elongated casing adapted to be connected to the other vehicle part, said casing having a side wall section inclined longitudinally toward the opposite side wall, a friction facing secured in the casing opposite said inclined wall section to engage one side of said friction plate, a movable member in the casing with a friction facing engaging the other side of said plate, the casing having an opening for the insertion of the movable friction member, an anti-friction roller between the movable member and said inclined wall section, a cover for said opening removably secured to the casing, a bolt slidably secured in a perforation through said cover and with its inner end in swivelling engagement with the movable friction member, a nut on the inner end of the bolt held against turning in the casing, and a spiral spring on the bolt between the nut and the cover.

16. In a shock absorber adapted to be interposed between an axle and the spring-suspended body of a vehicle, the combination of a friction plate adapted to be connected at one end to one of said vehicle parts, an elongated casing comprising side walls and an end wall adapted to be connected to the other vehicle part, said casing having openings at its ends and a side wall section inclined longitudinally toward the opposite side wall, a friction facing secured in the casing opposite said inclined wall section to engage one side of said friction plate, a movable member in the casing with a friction facing engaging the other side of said plate, an anti-friction roller between the movable member and the inclined wall section, a bolt slidably secured in a perforation through the end wall of the casing and with its inner end in swivelling engagement with the movable friction member, a nut on the inner end of the bolt held against turning in the casing, and a spiral spring on the bolt between the nut and the casing end wall.

17. In a shock absorber adapted to be interposed between an axle and the spring-suspended body of a vehicle, the combination of a friction plate adapted to be connected at one end to one of said vehicle parts, an elongated casing adapted to be connected to the other vehicle part, said casing being open at its ends and on one side from points intermediate its length to one end and the remainder of the last named side being closed by a wall inclined longitudinally toward the opposite wall, a friction facing secured in the casing opposite said inclined wall to engage one side of said friction plate, a movable member in the casing with a friction facing engaging the other side of said plate, an anti-friction roller between the movable member and said inclined wall, a cover formed to close the side wall opening and part of the adjacent end opening of the casing, the casing at the junction of said side and end openings having notched lugs and the cover having slots to pass over said lugs and interlock with its notches, a rod having an abutment thereon and slidably secured in a perforation through the end section of the cover, and a spiral spring on the rod with one end engaging the inner side of the end section of the cover and the other end engaging the abutment on the rod, the inner end of the rod having a freely detachable engagement with the movable friction member, whereby the cover, rod and spring can be applied to and detached from the casing as a unit and the spring serves both to press the movable friction member against the friction plate and in conjunction with the notched lugs to secure the cover to the casing.

18. In a shock absorber adapted to be interposed between an axle and the spring-suspended body of a vehicle, the combination of a friction plate adapted to be connected to one of said vehicle parts, an elongated casing adapted to be connected to the other vehicle part and having the said friction plate slidably disposed therein, a friction facing in the casing to engage one side of the friction plate, said casing having one of its side wall sections longitudinally inclined toward the said plate, a movable friction member interposed between the plate and said inclined wall section, said movable friction member having a main part stamped from sheet metal and formed with lateral flanges with opposite notches and a bearing plate disposed in said notches, and an anti-friction roller disposed in said notches to engage the bearing plate and the inclined casing wall.

In testimony whereof, I hereunto affix my signature.

SAMUEL K. WELLMAN.